United States Patent
Oh et al.

(10) Patent No.: US 12,147,266 B2
(45) Date of Patent: Nov. 19, 2024

(54) DISPLAY MONITOR INTEGRATED DOWN LIGHT

(71) Applicant: Dell Products L.P., Round Rock, TX (US)

(72) Inventors: Guentaek Oh, Singapore (SG); Yong Gu Kang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/095,285

(22) Filed: Jan. 10, 2023

(65) Prior Publication Data

US 2023/0152844 A1    May 18, 2023

Related U.S. Application Data

(62) Division of application No. 17/462,325, filed on Aug. 31, 2021, now Pat. No. 11,592,862.

(51) Int. Cl.
  *G06F 1/16* (2006.01)
  *F21V 8/00* (2006.01)
  *G02F 1/1333* (2006.01)
  *G02F 1/13357* (2006.01)

(52) U.S. Cl.
  CPC ......... *G06F 1/1601* (2013.01); *G02B 6/0091* (2013.01); *G02F 1/133308* (2013.01); *G02F 1/133603* (2013.01)

(58) Field of Classification Search
  CPC .............................................. G02F 1/133308
  See application file for complete search history.

(56) References Cited

U.S. PATENT DOCUMENTS

| 10,874,000 | B2 * | 12/2020 | Fan | A63F 13/50 |
| 2019/0033948 | A1 | 1/2019 | Sultenfuss | |
| 2019/0385493 | A1 | 12/2019 | Lei | |
| 2020/0166185 | A1 * | 5/2020 | Yuan | F21V 5/008 |

FOREIGN PATENT DOCUMENTS

EP    3479882 A1    5/2019

OTHER PUBLICATIONS

Dell, "Dell S3422DWG User's Guide," Jul. 2021, 71 pages, downloaded from https://downloads.dell.com/manuals/all-products/esuprt_electronics_accessories/esuprt_electronics_accessories_monitors/dell-aw3420dw-monitor_user%27s-guide_en-us.pdf on Aug. 31, 2021.
Dell, "Alienware AW3420DW Monitor User's Guide," Dec. 2020, 60 pages, downloaded from https://downloads.dell.com/manuals/all-products/esuprt_electronics_accessories/esuprt_electronics_accessories_monitors/dell-aw3420dw-monitor_user%27s-guide_en-us.pdf on Aug. 31, 2021.

* cited by examiner

*Primary Examiner* — Edmond C Lau
(74) *Attorney, Agent, or Firm* — Zagorin Cave LLP; Robert W. Holland

(57) ABSTRACT

An information handling system peripheral display monitor presents visual images at a liquid crystal display panel with illumination distributed across the display panel by a backlight. A light bar of plural light emitting diodes (LEDs) at a bottom side surface of the backlight directs illumination into the backlight from an upper surface and includes plural downlight LEDs on a bottom surface to direct illumination out a downlight opening formed in a housing of the display monitor.

6 Claims, 4 Drawing Sheets ered to process, stored, or
DISPLAY MONITOR INTEGRATED DOWN LIGHT

CROSS REFERENCE TO RELATED APPLICATIONS

This application is a divisional of U.S. patent application Ser. No. 17/462,325, filed Aug. 31, 2021, entitled "Display Monitor Integrated Down Light," naming Guentaek Oh and Yong Gu Kang as inventors, which application is incorporated herein by reference in its entirety.

BACKGROUND OF THE INVENTION

Field of the Invention

The present invention relates in general to the field of information handling system peripheral display monitors, and more particularly to an information handling system display monitor integrated down light.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information, typically for presentation at a display. On common type of display is a liquid crystal display (LCD), which generates visual images with liquid crystal pixels that filter illumination provided from a backlight. LCD's provide excellent visual images with large surface areas and even curved surface areas, which makes LCD's a popular choice for a wide variety of applications. For instance, LCD flat panel monitors are commonly found in enterprises to support business operations, such as word processing, communications and enterprise specific applications. LCD flat panel monitors are also commonly found in home systems where they are used to present entertainment, such as multimedia movies.

One advantage of LCD monitors is that the LCD flat panels fit into minimalist housings. Having a reduced housing size tends to reduce the weight of the monitor and also the awkwardness of moving the monitor for placement in a desktop space. A peripheral display monitor tends to have a more aesthetically appealing appearance where the visual images presented by the display panel extends across the entire front surface of the monitor. To achieve this appearance, manufacturers attempt to support LCD panels in housings with a minimal bezel at all four sides of the housing.

One distinct user population of high quality LCD monitors is the gaming population. Gaming applications typically rely upon high quality visual image presentation. Often gamers seek display monitors that have not just high quality images but also effects presented at the monitor housing, such as illumination at the display monitor base. FIG. 6 depicts a prior art DELL 3SNB display monitor that provides downlight illumination at the base of a display monitor housing 32 while a backlight 40 illuminates visual images at a display panel with backlight LED's 42. To provide downlight illumination, a downlight LED 46 is aligned with a window 66 to illuminate at the display monitor housing base. A difficulty with this arrangement is that the downlight LED consumes vertical space at the base of the display monitor housing, thus increasing the size of the housing and negatively impacting the end user experience.

SUMMARY OF THE INVENTION

Therefore, a need has arisen for a system and method which provides illumination at a display monitor housing base.

In accordance with the present invention, a system and method are provided which substantially reduce the disadvantages and problems associated with previous methods and systems for providing illumination at a display monitor housing base. A light bar that provides illumination to a backlight for presenting images to a display panel includes backlight LED's at a printed circuit board upper surface directed into the backlight and downlight LED's at the printed circuit board lower surface directed out a downlight opening of the display monitor housing to provide external illumination at the monitor housing base.

More specifically, an information handling system processes information with processing components disposed in a housing, such as CPU and memory, and presents the visual information at a display monitor, such as a peripheral display monitor interfaced through a display cable. For instance, the information handling system communicates visual images as pixel values to a display panel that generates the visual images with illumination provided by a backlight assembly, such as a backlight disposed behind the display panel that receives illumination from a light bar coupled to a bottom side surface of the backlight. The light bar has a printed circuit board with backlight LED's coupled to an upper side and directed against a bottom side surface of the backlight and downlight LED's coupled to a lower side and directed towards an opening in the display monitor housing to provide illumination external to the display monitor. A light guide disposed in the display monitor housing opening and against the backlight LED's directs the illumination in a desired manner. For example, the light guide has a light guide plate with a truncated pyramid shape and reflectors on opposing sides that direct the illumination at a desktop surface on which the display monitor rests.

The present invention provides a number of important technical advantages. One example of an important technical advantage is that a display monitor provides illumination at a housing base while maintaining a minimal housing structure, such as a reduced bezel size along the bottom side of the display monitor housing. A set of downlight LED's couples to a bottom surface of a light bar circuit board having backlight LED's at an upper surface so that power and control of the downlight LED's may be provided through the backlight light bar printed circuit board. Coupling the downlight LED's to the light bar printed circuit board minimize the vertical space consumed in the monitor housing to provide downlight illumination. A light guide disposed in an opening of the monitor housing at an opening aligned with the downlight LED's directs downlight illumination in a desired manner to provide an enhanced end user experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system display monitor provides a downlight from a light bar through a light guide disposed in an opening of the display monitor housing and at a support surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
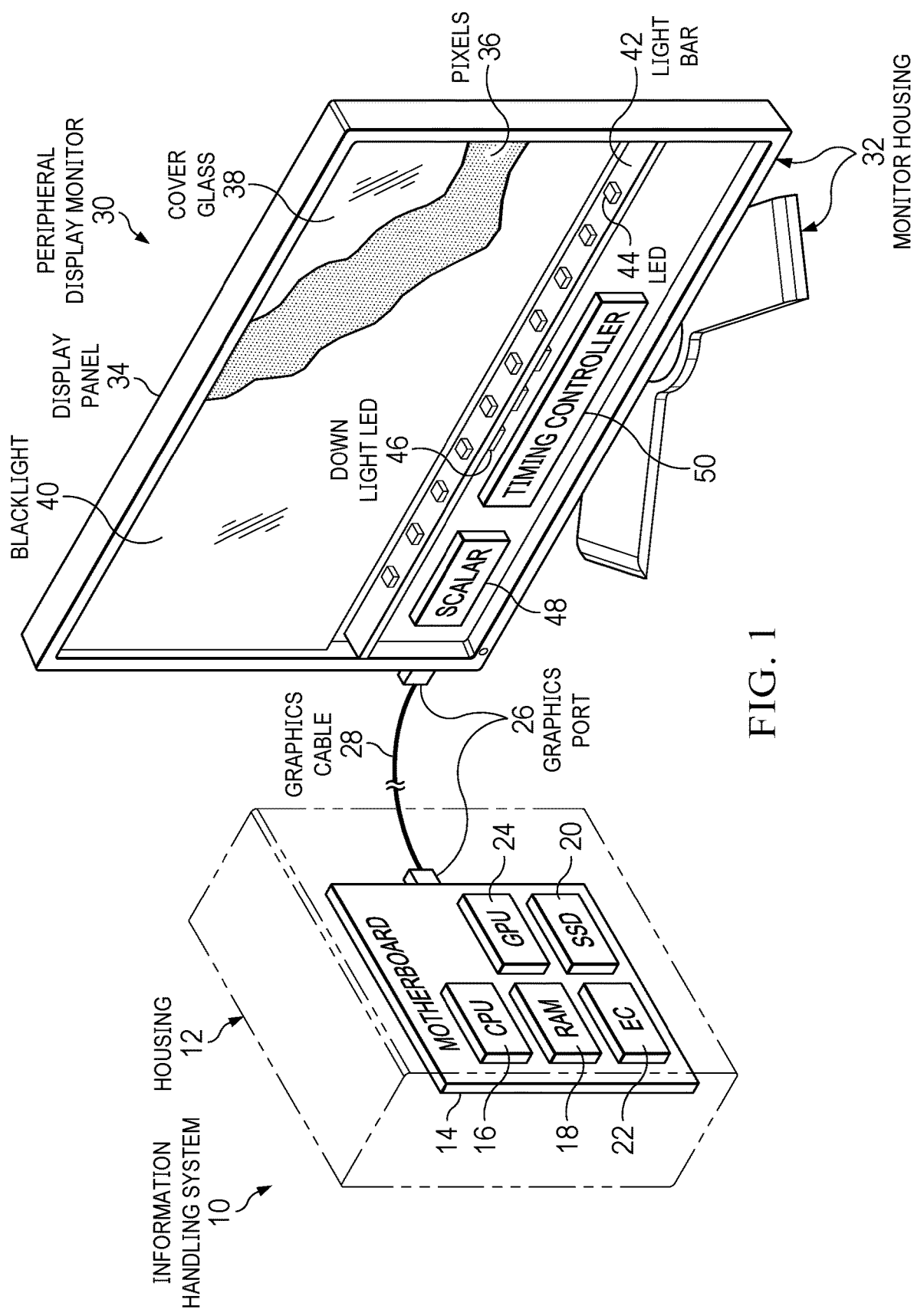
FIG. 1 depicts a block diagram of an information handling system interfaced with a display monitor that supports downlight illumination.

Referring now to FIG. 1, a block diagram depicts an information handling system 10 interfaced with a display monitor 30 that supports downlight illumination. In the example embodiment, information handling system 10 has a desktop configuration with a fixed housing 12 holding processing components that cooperate to process information. For example, a motherboard 14 couples to housing 12 and supports communication between processing components with integrated wirelines. A central processing unit (CPU) 16 executes instructions to process information in cooperation with a random access memory (RAM) 18 that stores the instructions and information. A solid state drive (SSD) 20 or other non-transient storage device provides persistent storage of the instructions and information during power down of the system. For instance, SSD stores an operating system and applications that are retrieved to RAM 18 at power up for execution on CPU 16. An embedded controller 22 manages physical operation of the processing components, such as application of power, management of thermal constraints and interactions with input/output devices. A graphics processing unit (GPU) 24 interfaces with CPU 16 to further process information for generating visual images for presentation at display monitor 30. For instance, GPU 24 defines visual images with pixel values that determine colors presented at pixels 36 of display monitor 30 and communicates the pixel values through graphics ports 26 and a graphics cable 28. In the example embodiment, information handling system 10 has a desktop configuration interfaced through a cable with a peripheral display monitor 30, however, in alternative embodiments portable or other types of information handling systems may generate pixel values and communicate the pixel values through wireless or other communication mediums.

Peripheral display monitor 30 presents visual images with a display panel 34 having plural pixels 36 that each provide a color based upon a pixel value scanned to the pixels from a timing controller 50, which accepts the pixel values from graphics port 26. In the example embodiment, display panel 34 is a liquid crystal display (LCD) having liquid crystal pixels 36 that adjust their crystalline state to filter light provided by a backlight 40 coupled behind display panel 34. For instance, backlight 40 has a conventional structure of a light guide with an optical quality acrylic substrate or similar material captured in a reflector and diffuser to provide an even illumination across the back side of display panel 34 so that pixels 36 have a well-distributed illumination that provides an intended visual image. A glass cover 38 on the front of display panel 34 provides protection against impacts. A scalar 48 and timing controller 50 include processing resources that execute code stored in flash memory or other non-transient memory to scan visual images to pixels 36. A light bar 42 couples to a bottom side surface of backlight 40 and has plural distributed backlight LED's 44 that provide illumination into backlight 40, such as based upon commands and power provided by scalar 48 and/or timing controller 50. Light bar 42 also has plural downlight LED's coupled to a lower side and directed towards a base of monitor housing 32 where monitor housing 32 rests on a support surface. Downlight LED's 46 provide illumination external to monitor housing 32 through an opening in monitor housing 32 as described in greater detail below. In various embodiments, illumination from downlight LED's 46 is controlled by instructions stored as firmware in flash memory of scalar 48, timing controller 50 and/or embedded controller 22.

Figure 2:
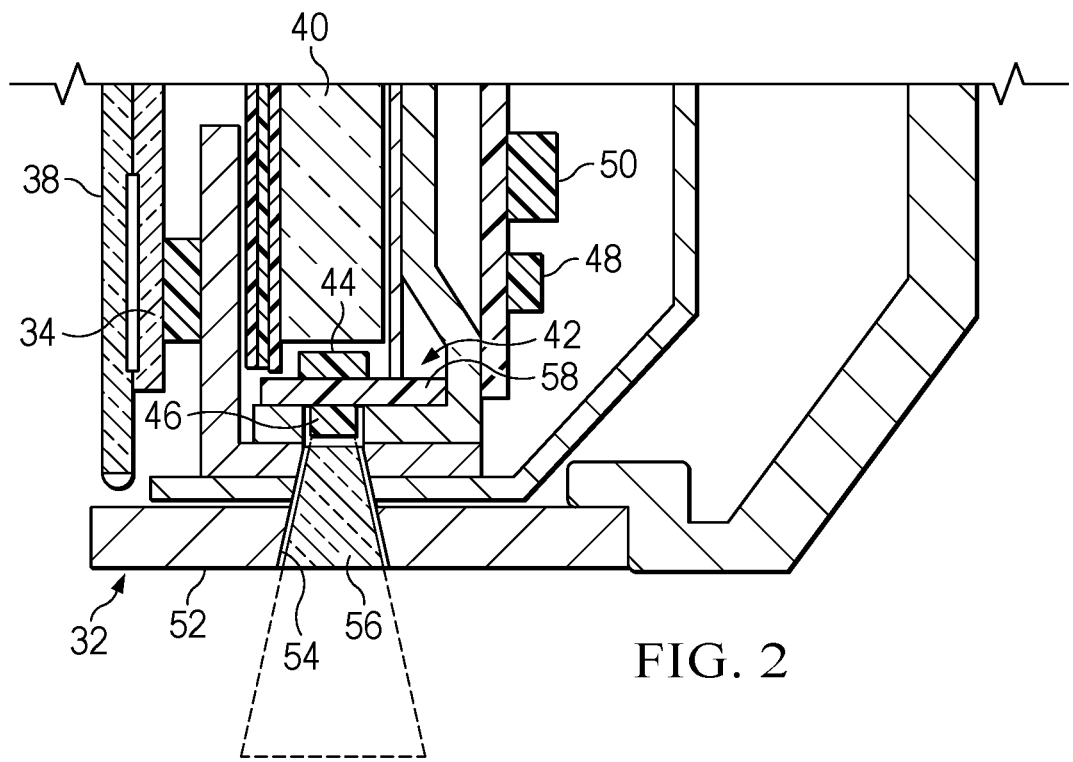
FIG. 2 depicts a side cutaway view of a display monitor housing having a downlight opening for directing illumination to the exterior of the display monitor housing.

Referring now to FIG. 2, a side cutaway view depicts a display monitor housing 32 having a downlight opening 54 for directing illumination to the exterior of the display monitor housing. In the example embodiment, backlight 40 receives illumination from light bar 42 with backlight LED's 44 coupled at the bottom side surface of backlight 40. Backlight 40 distributes the illumination evenly across a display panel 34 to illuminate visual images generated by pixels and presented through cover glass 38. Timing controller 50 and scalar 48 interface with a printed circuit board 58 of light bar 42 to control application of power to illuminate backlight LED's 44 and downlight LED's 46. Downlight opening 54 formed in the base 52 of display monitor housing 32 provides a path through which illumination may pass from downlight LED's 46 through a light guide 56 for illumination below display monitor housing 32. Although the example embodiment directs downlight illumination at the display monitor base, in alternative embodiments, light guide 56 may direct the illumination in other directions, such as out the front side of display monitor housing 32 or at the base offset forwards or backwards. Light guide 56 is a material conductive of illumination, such as an optical acrylic that directs and distributes illumination in a desired manner as described in greater detail below.

Figure 3:
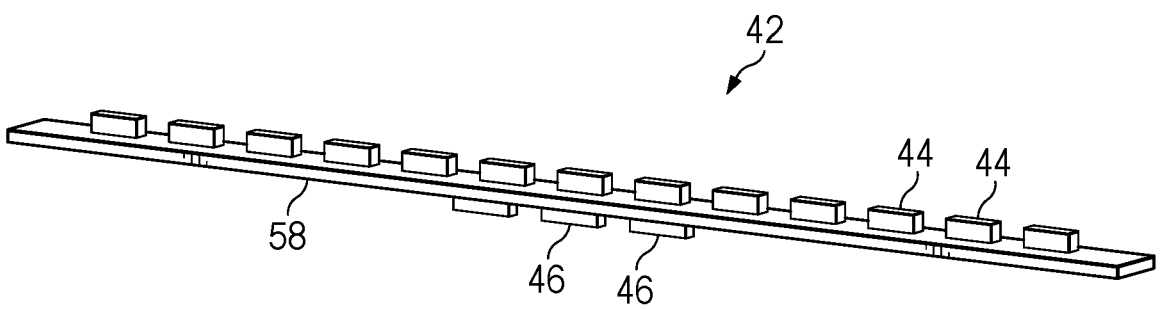
FIG. 3 depicts a side perspective view of a light bar configured to provide bidirectional illumination to a backlight and to display monitor housing exterior.

Referring now to FIG. 3, a side perspective view depicts a light bar 42 configured to provide bidirectional illumination to a backlight and to display monitor housing exterior. In the example embodiment, a printed circuit board 58 has plural backlight LED's at an upper surface evenly distributed across the length to provide evenly distributed illumination to the backlight. Three downlight LED's 46 couple to the bottom surface of printed circuit board 58 at a central location that aligns with the opening of the display monitor housing. Three downlight LED's 46 provide flexibility for adjusting the brightness of exterior illumination, such as by using each LED independently.

Figure 4:
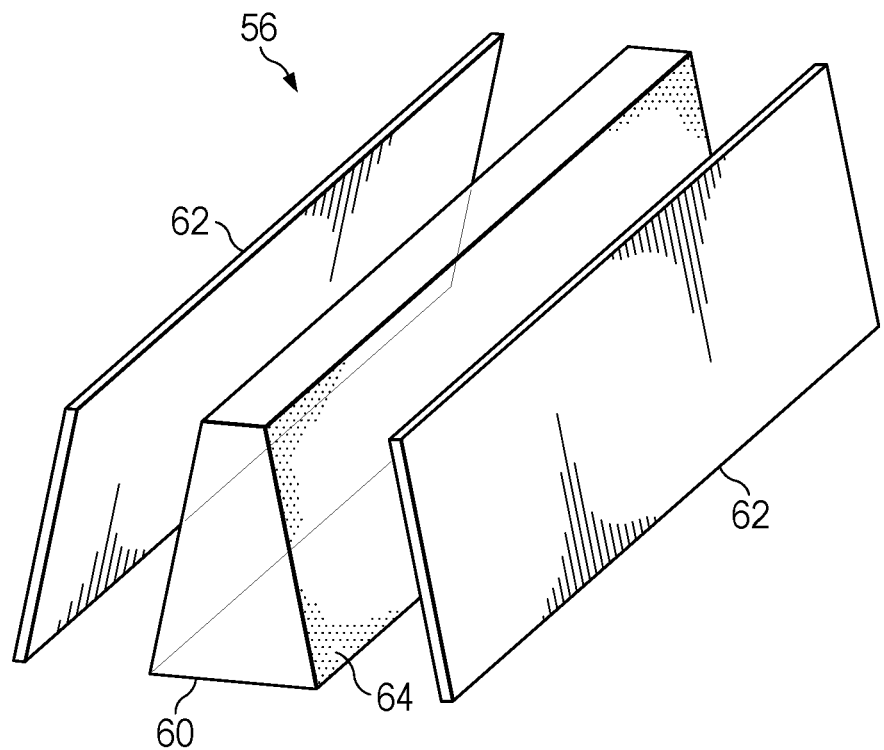
FIG. 4 depicts an exploded perspective view of a light guide to direct illumination from a display monitor housing opening to an exterior location.

Referring now to FIG. 4, an exploded perspective view depicts a light guide to direct illumination from a display monitor housing opening to an exterior location. A light guide plate 60 promotes passage of illumination, such as with an optically transmissive acrylic material having an exposed upper surface to accept illumination and an exposed lower surface to transmit illumination to the housing exterior. In the example embodiment, light guide plate 60 has a truncated pyramid shape with a narrow upper surface and wide lower surface to promote a wider illumination pattern at the display monitor housing exterior. A pair of reflectors 62 couple to the exterior side surface of light guide plate 60 to conserve light energy and direct the light energy towards an exit at the wide bottom surface. Reflectors 62 have a black outer surface that suppresses light leakage. Patterning 64 formed in the outer surface of light guide plate 60 diffuses illumination to help promote efficient light transmission towards the broad bottom surface and at the exterior.

Figure 5:
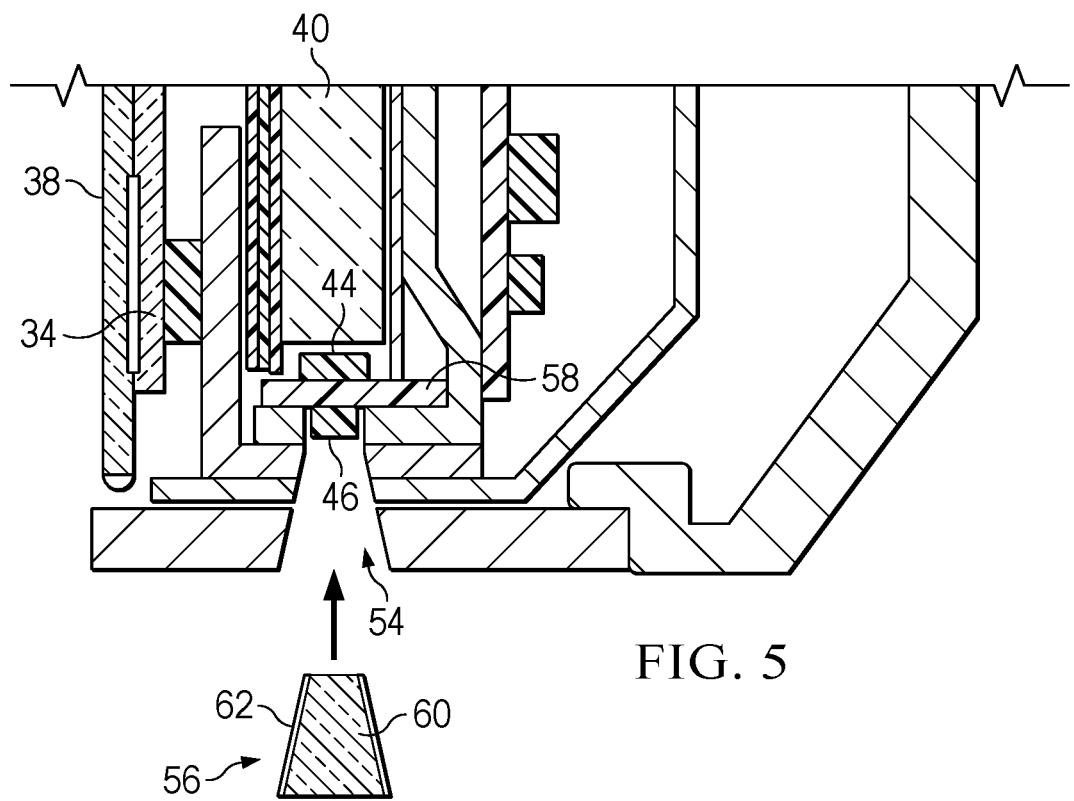
FIG. 5 depicts a side cutaway view of a light guide aligned for insertion into the display monitor housing.
Figure 6:
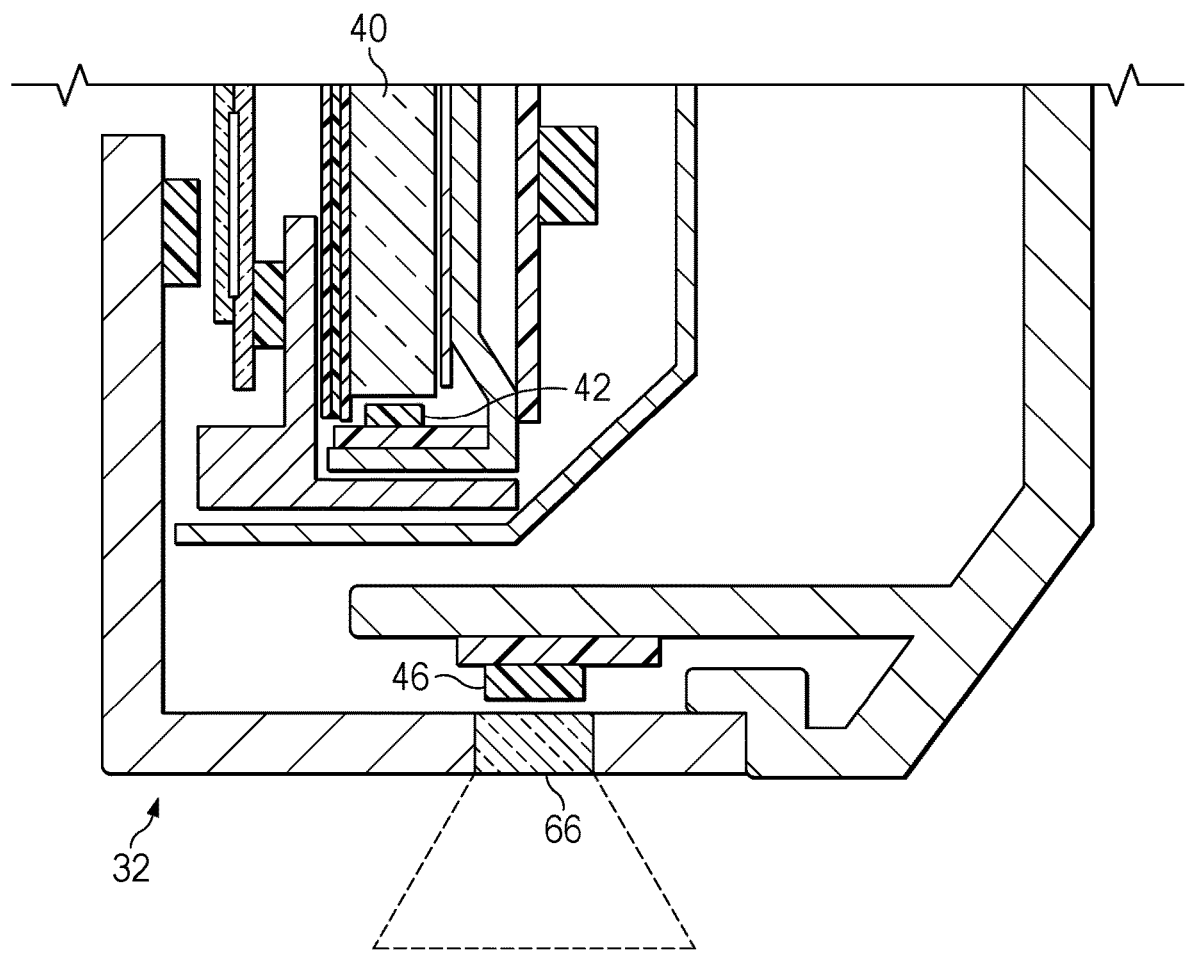
FIG. 6 depicts an example of a prior art peripheral display monitor that provides downlight illumination.

Referring now to FIG. 5, a side cutaway view depicts light guide 56 aligned for insertion into the display monitor housing. In the example embodiment, light guide plate 60 has reflectors coupled to the side surfaces and is sized to fit into opening 54. Rather than coupling into opening 54 with a fixed orientation, light guide 56 may fit into a moveable brace to allow an end user to control the direction of illumination that exits to the housing exterior. In one example embodiment, logic executing on a processing resource of the display may provide an automated control of the illumination vector at the display monitor housing exterior.

Although the present invention has been described in detail, it should be understood that various changes, substitutions and alterations can be made hereto without departing from the spirit and scope of the invention as defined by the appended claims.

What is claimed is:

1. A method for providing illumination external to a peripheral display monitor, the method comprising:
   directing illumination from a light bar into a backlight to illuminate visual images defined by pixels of a display panel;
   directing illumination from the light bar through an opening of a housing of the display monitor to a location external to the housing of the display monitor;
   coupling a first set of LED's to an upper surface of a printed circuit board of the light bar and directed into the backlight; and
   coupling a second set of LED's to a lower surface of the printed circuit board of the light bar and directed through the opening of the housing of the display monitor.

2. The method of claim 1 further comprising:
   coupling a light guide into the opening of the housing of the display monitor; and
   directing illumination from the second set of LED's through the light guide.

3. The method of claim 1 further comprising:
   coupling reflectors to opposing sides of a light guide plate of the light guide; and
   directing the illumination of the second set of LED's out a bottom surface of the light guide plate with the reflectors.

4. The method of claim 3 further comprising:
   adjusting an alignment of the light guide plate to adjust the location for illumination external to the housing of the display monitor.

5. The method of claim 4 wherein the light guide plate comprises a truncated pyramid shape.

6. A method for providing illumination external to a peripheral display monitor, the method comprising: directing illumination from a light bar into a backlight to illuminate visual images defined by pixels of a display panel; directing illumination from the light bar through an opening of a housing of the display monitor to a location external to the housing of the display monitor; coupling a first set of LED's to an upper surface of a printed circuit board of the light bar and directed into the backlight; and coupling a second set of LED's to a lower surface of the printed circuit board of the light bar and directed through the opening of the housing of the display monitor; and adjusting illumination provided from the second set of LED's with commands from an information handling system communicated to the display monitor through a display cable.

* * * * *